United States Patent [19]

Fathauer

[11] 3,892,436
[45] July 1, 1974

[54] RETRACTABLE LATCH MECHANISM FOR CARGO CONTAINER SPREADERS

[75] Inventor: Jack E. Fathauer, Roxboro, N.C.

[73] Assignee: Midland-Ross Corporation, Cleveland, Ohio

[22] Filed: Apr. 11, 1974

[21] Appl. No.: 460,112

[52] U.S. Cl......... 294/81 SF; 24/221 R; 105/366 B; 248/119 R; 248/361 R; 294/67 DA
[51] Int. Cl. .............................................. B66c 1/00
[58] Field of Search......... 294/81 SF, 67 R, 67 DA; 248/361 R, 119 R; 105/366 B, 366 C; 24/221 R; 296/35 A

[56] References Cited
UNITED STATES PATENTS

| | | | |
|---|---|---|---|
| 3,612,466 | 10/1971 | Arnold | 105/366 B |
| 3,643,906 | 2/1972 | Werner et al. | 248/361 R |
| 3,677,599 | 7/1972 | Shannon | 294/81 SF |
| 3,682,423 | 8/1972 | Scarborough | 248/361 R |
| 3,682,432 | 8/1972 | Lapaich | 105/366 B |
| 3,724,796 | 4/1973 | Hawkins et al. | 248/361 R |
| 3,751,096 | 8/1973 | Wyon | 294/81 SF |

FOREIGN PATENTS OR APPLICATIONS 1,199,594  7/1970  United Kingdom............ 105/366 B

*Primary Examiner*—Evon C. Blunk
*Assistant Examiner*—Jeffrey V. Nase
*Attorney, Agent, or Firm*—Woodrow W. Portz

[57] ABSTRACT

Twistlock mechanism for cargo container spreaders which includes vertically retractable latch members which may be moved between lower operable positions and upper inoperable positions wherein they are at least substantially withdrawn within the spreader housing structure to avoid any undesired contact with container tops or other upward facing surfaces.

11 Claims, 14 Drawing Figures

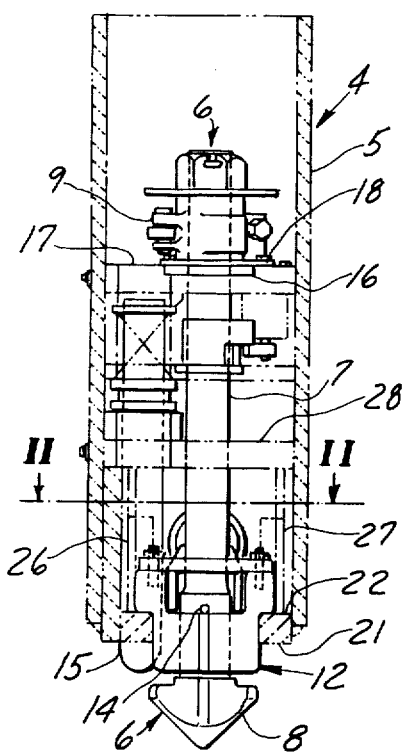
FIG. 1
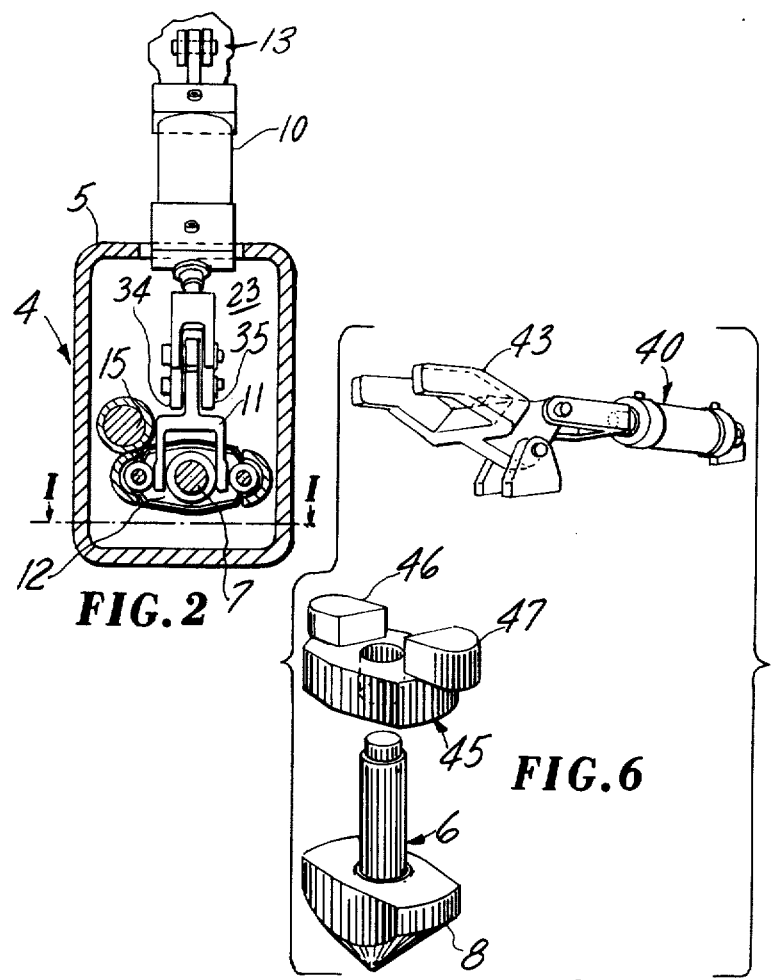
FIG. 2
FIG. 6
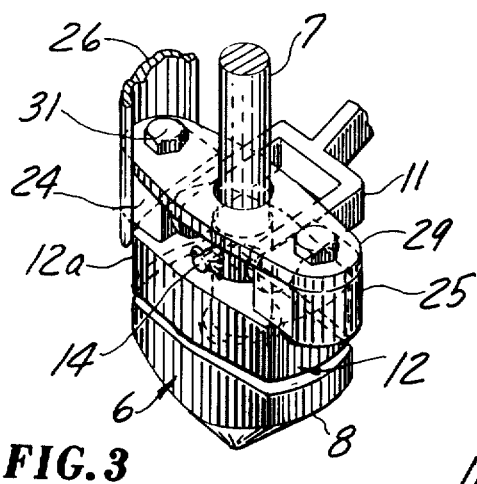
FIG. 3
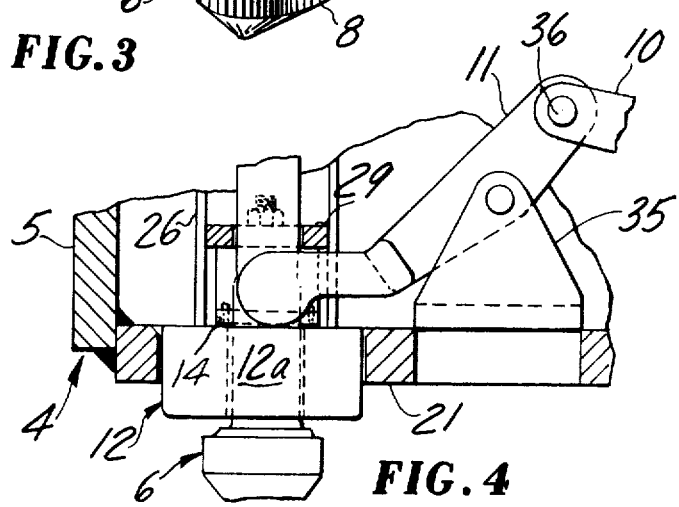
FIG. 4
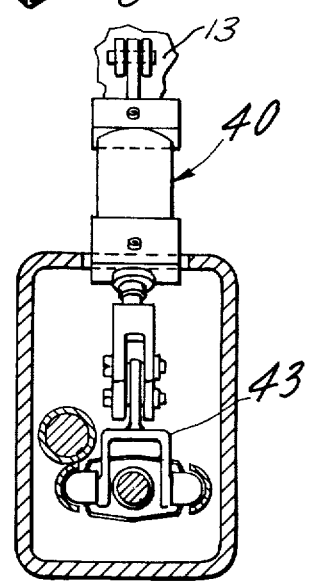
FIG. 5

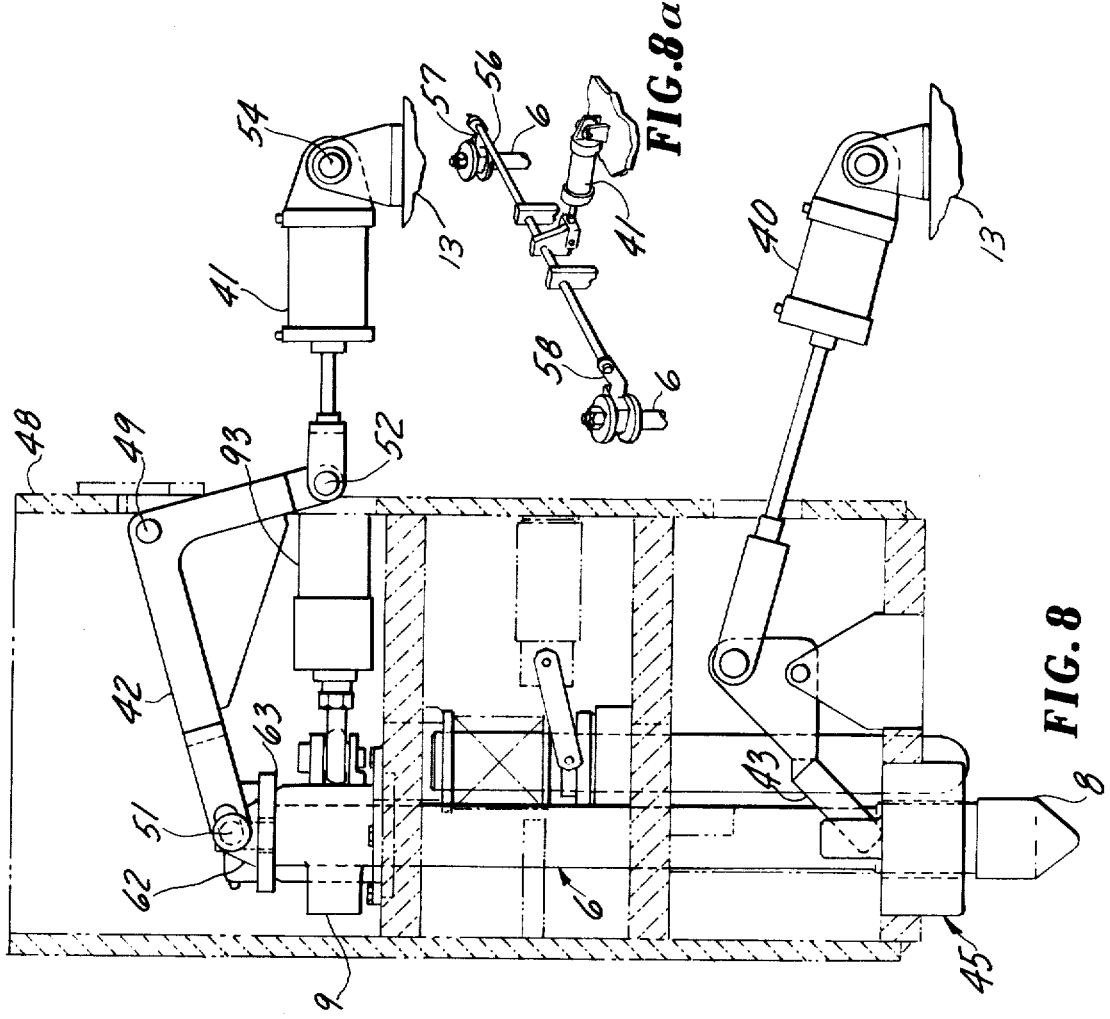
FIG. 8a
FIG. 8
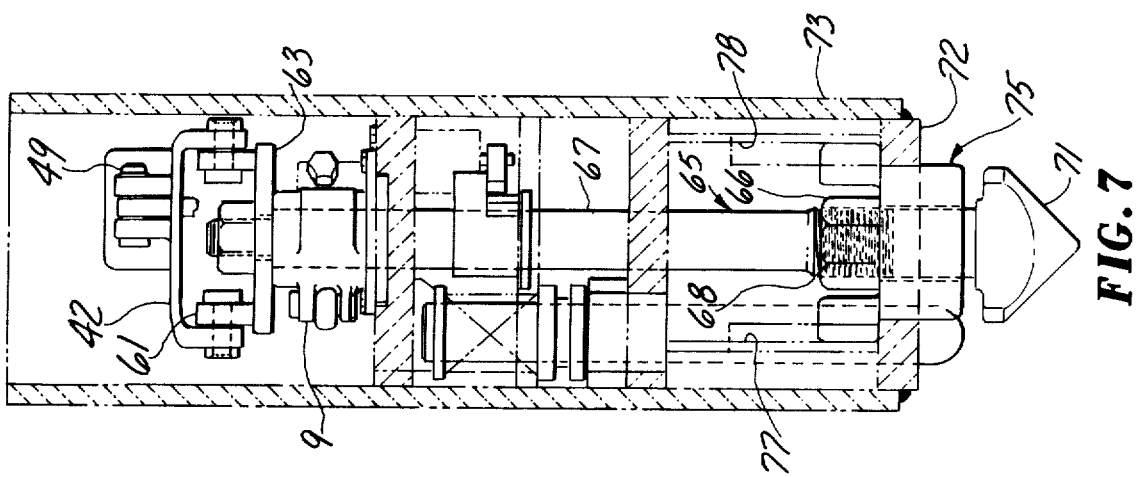
FIG. 7

RETRACTABLE LATCH MECHANISM FOR CARGO CONTAINER SPREADERS

BACKGROUND OF THE INVENTION

The modern twistlock spreader is equipped with latch heads which taper downwardly into sharp points. The conventional twistlock spreader must be maneuvered with much care to avoid denting or rupturing the top skin material of cargo containers. Spreaders of the detachable type are often set down for storage on surfaces subject to marring. Severe mishandling of the spreaders, while detached from containers, occasionally results in damage to downwardly exposed latch heads or the supporting shafts therefor.

Because of the vulnerability of the latch members to shaft bending, the corner latch housings of a spreader are normally constructed with the floors of the housing having downwardly extending central apertured bosses, in fixed integral relation with respective floors, which have the same periphery in a horizontal plane as the latch heads which are journalled therein and extend downwardly from the undersurface of the housing a distance at least equal to the upward facing walls of the container corner castings. The bosses of a spreader are precisely positioned and oriented within a horizontal plane to enter the latch openings of the container corner castings and approximately fit the peripheries thereof so that when the latch members of the spreader are turned 90 degrees, there is matching peripheral conformation with the bosses with the openings in the top walls of the container corner castings but the latch heads interlock with such top walls by engaging their undersurfaces. The presence of such bosses and the need for proper lateral support of the latch members present special problems in providing retraction of latches into the latch housings. Furthermore, the latch member is rotated on a vertical axis by swinging a radial lever conventionally fixed to the shaft of the latch member at a desired elevation within the housing of the latch mechanism.

The essential object of the invention is to provide latch mechanism for spreaders wherein the latch members of a spreader may be retracted upwardly relative to the plane of those undersurfaces of the latch housings which normally engage the corner castings of containers.

A further object is to bring about such modifications in the construction of spreaders as to permit withdrawal of latches into the housing structure of the spreader without interfering with the function of the protective structure for the twistlock latch member in operating position, such as afforded by the above described bosses.

In promoting safe operation, it is a further object to provide mechanism which will afford positive withdrawal of latch heads into respective housings or ejectment of latch heads to effect complete protrusion thereof whereby the simultaneous positioning of the latch heads in either position may be assured regardless of opposing forces.

BRIEF SUMMARY OF THE INVENTION

The present invention resides in the latching mechanism of a cargo container spreader comprising in essence a plurality of housings providing floors with respect to which retractable latch members comprising vertical shafts and latch heads are downwardly located at the end of the shafts and which may be withdrawn upwardly within the housings for protection of the latch members, or objects which the protruding latch heads might gouge or penetrate. The mechanism further comprises retractable boss means centrally apertured ovoid movable collars supported on the shafts in journal bearing relation therewith to be lifted into and out of seating relation with the housing floor as a result of being engaged by the latch heads or other detent means attached to the latch members. The collars function during container handling in the same manner as the aforesaid conventional bosses. The mechanism further includes power means such as hydraulic cylinder units acting on the members in both upward and downward movements in order to obtain positive positioning at either end of the range of movement. A slip joint is provided between the crank arm and the shaft for rotating the latch member between latching and unlatching positions to accommodate vertical movements of the shaft relative to such crank arm or other elements on the shaft which have to remain in a certain horizontal plane.

BRIEF DESCRIPTION OF THE DRAWING

FIG. 1 is an elevation in section of latch mechanism according to one embodiment of the invention taken along the line I—I of FIG. 2.

FIG. 2 is a section view of the mechanism of FIG. 1 as viewed along the plane of line II—II of FIG. 1.

FIG. 3 is a fragmentary perspective enlarged view of the latch member in association with guide structure and a traversing fork also shown in FIGS. 1 and 2.

FIG. 4 is a fragmentary side elevation of portions of the latch member, housing therefor, and traversing mechanism therefor illustrated in FIGS. 1, 2, 3.

FIGS. 5 and 6 are fragmentary horizontal section and exploded perspective views, respectively, of modified latch mechanism including generally the latch member and a single-acting actuator for downward ejection of the latch member.

FIG. 7 illustrates an end elevation in section showing another modified latch mechanism wherein the latch member is vertically reciprocated solely by a device connected with the top of the latch member in the manner shown in FIG. 8.

FIG. 8 is a side elevation in cross section illustrating another modification of latching mechanism wherein upper and lower actuators act alternately on a latch member to raise and lower, respectively, the latch member with respect to its lower operative ejected position.

FIG. 8a is a fragmentary perspective view of modified latch-lifting mechanism.

DESCRIPTION OF PREFERRED EMBODIMENTS

Figure 12:
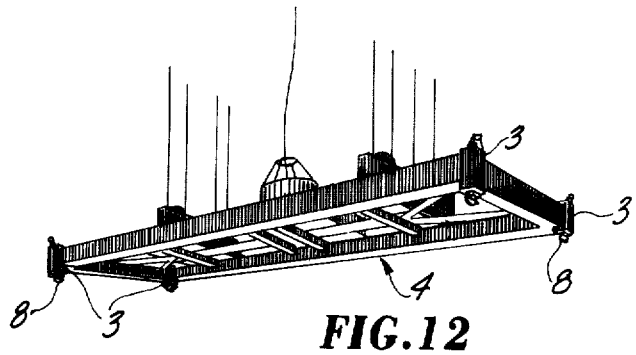
FIG. 12 is a plan view of a spreader comprising retractable twistlock mechanisms herein described.

FIGS. 1, 2, 3 and 4 relate to a twistlock unit 3 as normally fixedly incorporated by sets of four in a spreader 4 (see FIG. 12). The unit comprises a box-like housing 5, a twistlock member 6 comprising a shaft 7 and a latch head or latch 8, a crank arm 9, a double acting power cylinder 10 connecting at one end with a bell crank 11 and at the other end with supporting means 13 in fixed relation with the housing 5. The power cylinder is thus arranged to vertically reciprocate the member 6 and a retractable boss means, i.e., guard collar 12 encircling the shaft 7 and confined lengthwise thereon between detent means, such as a pin 14, and the head 8 to the follow twistlock member 6 in longitudinal vertical movement. FIGS. 1 and 2 also show a vertically movable plunger 15 normally provided on twistlock mechanisms to operate safety switch mechanism not a part of this invention. The crank lever 9 is of conventional design and is connected with power mechanism (not shown) normally provided for effecting rotation of twistlocks. However, in a way that is unconventional, the hub portion of the lever 9 and the shaft have interengaging splines or key and keyways which enable the shaft to move longitudinally through the crank hub without loss of torsional drive. The crank hub has a radially extending lower flange 16 trapped in a recess of a transverse wall 17 of the housing 5 by a collar 18 secured to the wall in overlapping relation with the flange 16.

Figure 10:
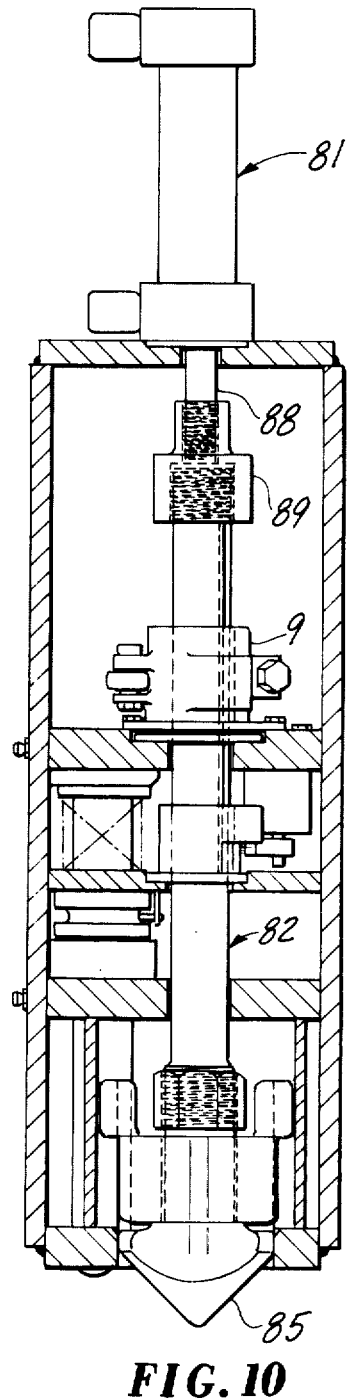

Essentially, this invention is involved with structure which enables the longitudinal retraction of the twistlock member 6 and the guard collar 12 therefor upwardly from an operating position as shown in FIG. 1 to an upper position analogous to that shown for another embodiment in FIG. 10 wherein the latch 8 is substantially withdrawn within the housing 5. The housing floor 22 defines a collar opening 20 the periphery of which constitutes stop means which supports the collar 12 against any lateral movement when the collar occupies its lowest position. At complete retraction, the latch is located fully inward of the collar opening 20 in the housing floor 22. The guard collar 12 projects in the lower operating position of the twistlock below the undersurface 21 of the housing floor 22. The downward protruding portion of the guard collar surrounds the portion of the shaft 7 immediately adjacent the latch 8 and serves as a bearing in one aspect to center the member 6 within the collar opening and in another aspect to absorb lateral thrusts from directly reaching the shaft 7 and prevent the shaft 7 from being bent. Moreover, as the top aperture of the container corner casting must be large enough to receive the latch, it is necessary to have a projection into such casting aperture to maintain the latch 8 in proper registry both during locking position and in preparing the latch 8 for withdrawal through the aperture of the casting. Thus, the guard collar 12 has the same function as the downwardly ovate boss normally provided on the floor of a conventional twistlock housing.

Guide means is provided to permit the guard collar 12 to move upwardly or downwardly in precise vertical alignment with the shaft axis. The collar comprises, as a portion of such guide means, a pair of horizontally spaced guide elements or channels 24, 25 welded or otherwise secured to the upper surface of the lower ovate collar element 12a. The elements 24, 25 are spaced sufficiently at opposite sides of the shaft to receive the two-tine fork or bifurcate portion of the bell crank 11 therebetween with the shaft 7 received between the tines of the fork. In order that the guard collar 12 shall be in guide relation with the housing 5, a pair of vertically elongate guides 26, 27 provided as another portion of the aforementioned guide means, are fixed as by welding to portions of the housing. These guides are parallel in the vertical direction and, as shown, have inner concave surfaces which are complementary to the radially outer surfaces of the elements 24, 25. As shown, the guides 26, 27 are secured to the housing 4 and partition means, such as an upward horizontal partition 28 of the housing.

In the embodiment of FIGS. 1–4, the single acting cylinder operates to both raise and depress the twistlock member as a result of the confinement of the fork of the bell crank 11 between the upper surface of guard element 12a and a detent piece, such as the cap plate 29. As shown in FIG. 3, the plate 29 has a central aperture through which the shaft 7 extends in free relationship. Plate 29 is secured to the upper surfaces of elements 24, 25 by cap screws 31 or other suitable means.

As shown in FIG. 4, the bell crank 11 is pivotally supported through a pin connection by clevis elements 34, 35 fixed to the housing floor 22. The power cylinder 10 connects with the bell crank at pin 36. The other end of the cylinder 10 is pivotally connected to support structure in fixed relation with the housing 5 such as a portion of a spreader frame to which the housing is affixed. Accordingly, when the assembly of the power cylinder is contracted, the bell crank 11 rotates clockwise to engage the plate 29 to raise the assembly consisting of the guard collar and the twistlock member to a position wherein the bottom of the latch 8 may be substantially flush with the undersurface 21 of the housing floor. Comparatively less power is needed to lift the latching assembly than to depress it under some conditions of operation. For this reason, the cylinders needed to operate four latches are selected for sufficient power to drive the latches and associated guard collars into top corner castings of containers under slightly misaligned conditions wherein the latch and the collar element 12a enter its respective container opening and bring about correct registry of the container and the spreader.

FIGS. 5 and 6 illustrate mechanism for returning the twistlock member to its depressed position which may be considered in FIG. 8 as the lower power cylinder 40 of latch retracting and ejecting apparatus. The cylinder 40 and the bell crank 43 which mechanically connect one end of the cylinder to the twistlock member may be regarded as the member-ejecting actuator.

The other end of the power cylinder 40 is connected as shown to the supporting means 13 in fixed relation with the housing 5. The apparatus of FIG. 8 also comprises a member-retracting actuator including an upper cylinder 41 and a bell crank 42 linking this cylinder and an upper portion of the twistlock member 6.

In the embodiment of FIGS. 5, 6 and 8, the construction of the various parts of the twistlock member depressing or ejecting assembly, i.e., power cylinder 40 and associated bell crank 43, are arranged and mounted similarly as found in the earlier described embodiment of FIGS. 1–4. The principal difference is that the twistlock member depressing mechanism is relied upon to raise the twistlock member and guard collar assembly. In this instance, a plate, such as plate 29, of the earlier described embodiment, is not required to be secured across the top of guide elements 46, 47 since the collar 45 is not used for lifting the member 6. For the same reason, member 6 is not apertured for extension of a pin therethrough, such as pin 14 of the earlier described embodiment.

Retraction of the twistlock member and the guard collar 45 is effected in the second embodiment entirely by the single-acting cylinder 41 and its associated bell crank. As shown, the bell crank is pivotally connected to the twistlock housing 48 at 49 with its opposite ends pivotally connected to the member 6 and the power cylinder connecting rod at points 51, 52, respectively. Forcing of the power cylinder connecting rod outwardly pivots the bell crank 42 clockwise to lift on the guard collar and twistlock member assembly. The cylinder 41 is pivotally anchored to spreader structure in fixed relation with the twistlock housing within the pivotal joint at 54.

As alternative retracting actuator construction, the cylinder 41 may be pivotally anchored farther toward the middle of a spreader to cause it to act simultaneously on the twistlock members of the two transversely spaced twistlock mechanisms at one end of a spreader. This is accomplished as illustrated in FIG. 8a by connecting the cylinder 41 in cranking relation with the rotatable rod 56 extending transversely of the end of the spreader and provided with crank arms 57, 58 connected with separate twistlock rotors 6. The bell crank 42, or the crank arms 57, 58, are connected to the top of the twistlock member in the manner shown in FIGS. 7, 8, and 8a. These figures show the bell crank 42 to terminate over the member 6 in a bifurcate portion of which the tines pivotally connect with eye portions 61, 62 of an annular centrally apertured bearing plate 63 with respect to which the member 6 may rotate when cranked by the crank arm 9.

FIG. 7 also illustrates still another embodiment of the invention wherein the cylinder 41, which was essentially single acting within the embodiment of FIGS. 5, 6 and 8, is now double acting with full hydraulic power applicable to both inward and outward strokes of the piston rod of cylinder 41. As shown, the same drive system, i.e., the bell crank 42 and the cylinder 41, when double acting, is adapted for connection with individual twistlock mechanisms. However, cylinder 41 in its double acting form may be connected as shown in FIG. 8a with the torsion rod 56 to actuate a pair of spaced latchlock mechanisms. Since, in apparatus shown in FIG. 7, lower ejecting actuators are absent, the twistlock member 65 is provided with detent means such as the nut 66 in threaded relation with the member shaft 67 turned to a proper setting on the threads 68 to position the latch 71 at its proper spacing below the floor 72 of the twistlock housing 73. The guard collar 75 of FIG. 7 may be similar, as shown, in construction to that of guard collars 12 and 45 of the previously described embodiments. The construction of guides 77, 78 and their arrangement with respect to the guard collar is similar to that of analogous structure found in the earlier described embodiments.

Figure 9:
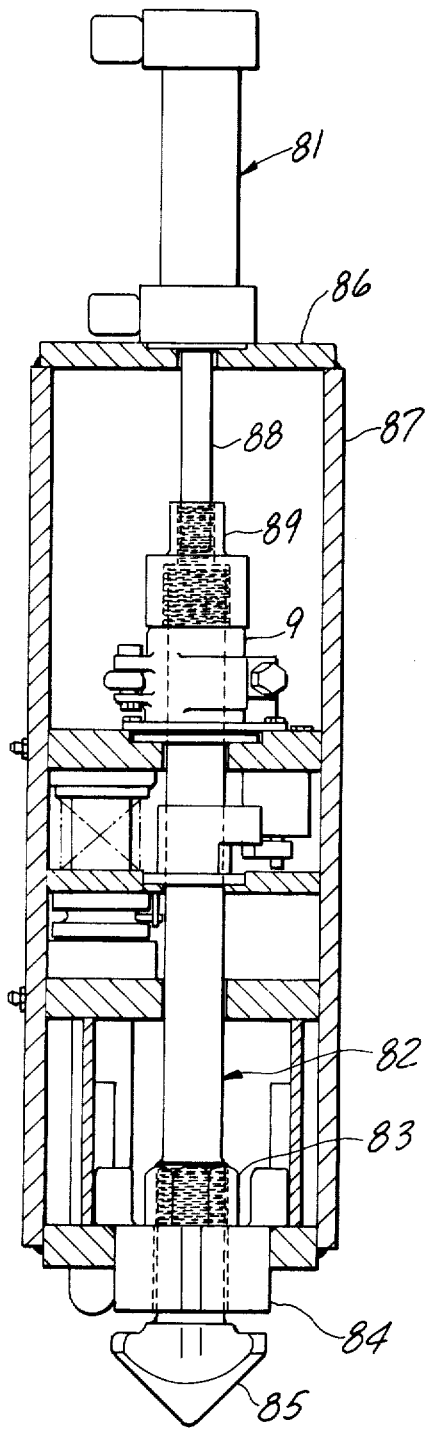
FIGS. 9 and 10 are end and side elevation views, in cross section, respectively, illustrating another modified latch mechanism wherein an actuator is mounted in direct coaxial drive with the latch member for effecting the movements of the latch member into and out of housing for the mechanism.

FIGS. 9 and 10 depict a modified form of retractable twistlock mechanism which may be resorted to where there is sufficient space above the twistlock housing. The mechanism of FIGS. 9 and 10 comprises a twistlock member 82 which may be of construction identical to member 65 of FIG. 7 wherein a nut 83 in threaded relation with the member assures positive depression of the guard collar 84 into its lower position. Lifting of the guard collar is effected in the same manner as in the previously described embodiments, i.e., by engagement of the top of the latch 85 with the undersurface of the collar. The power cylinder 81 is affixed to the top wall 86 of the twistlock housing 87 with its piston rod 88 in coaxial relation with the shaft 82 of the twistlock member. Rod 88 and the shaft 82 are connected as shown by a coupling 89 shown in threaded relation with both the rod and the shaft. FIG. 10 illustrates a partially retracted upward position of the twistlock member 82 typical of that obtainable by the other previously described embodiments.

Figure 11:
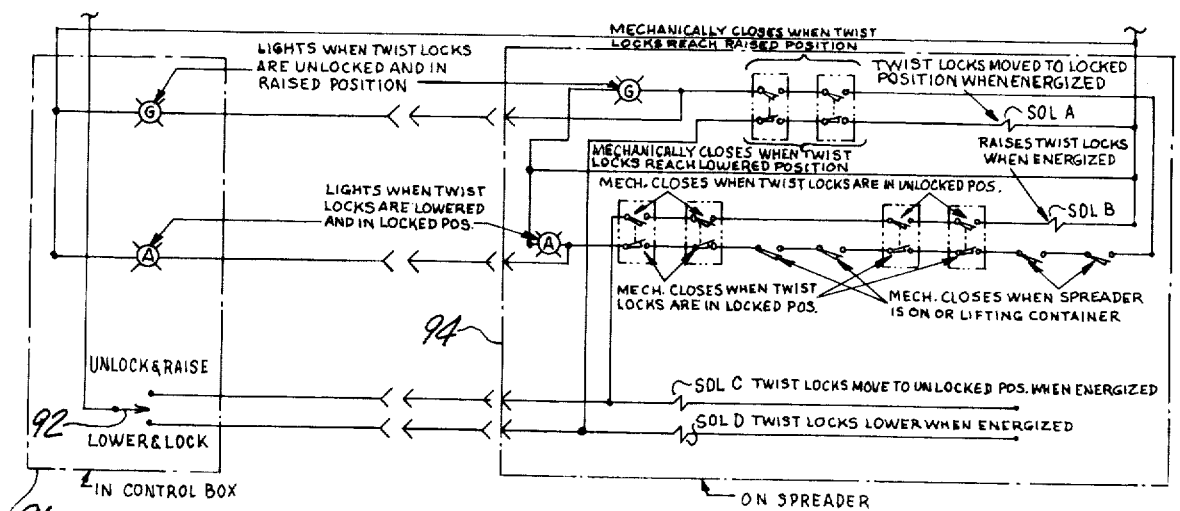
FIG. 11 is an electrical diagram of apparatus for actuating twistlock mechanisms comprising retractable twistlock members suitable for the actuation of a spreader twistlock system according to the embodiments of FIGS. 1, 7 and 9.
Figure 13:
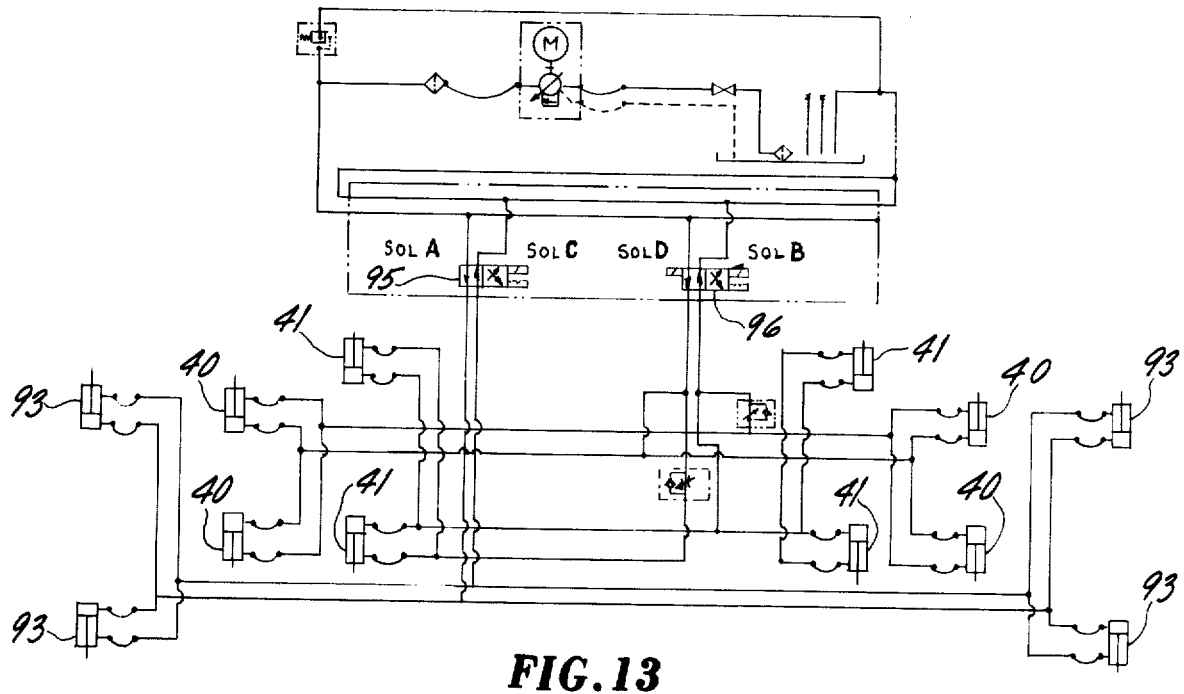
FIG. 13 is a hydraulic diagram of actuating equipment responsive to the apparatus of the electrical diagram of FIG. 11.

FIGS. 11 and 13 are electrical and hydraulic diagrams, respectively, of simple systems for actuating hydraulic cylinders on a spreader, such as spreader 4 shown in FIG. 12. The spreader comprises four twistlock assemblies wherein the twistlock members 6 are raised by cylinder 41 and ejected from respective housings by cylinders 40. The members are rotated by cylinders 93 of FIG. 13. Solenoid valve 96 controls the flow of oil to and from cylinders 40 and 41. Solenoid valve 95 controls passage of oil to and from latch-rotating cylinders 93.

The circuitry shown in FIG. 11 is that portion of the crane circuitry which energizes solenoids A, B, C and D. Elements of the electrical and hydraulic systems depicted by both diagrams may be identified by symbols drawn in accordance with publications Y14.17 and Y32.2 published by American National Standards Institute.

What is claimed is:

1. Retractable latching mechanism for a cargo container spreader comprising:

a housing having a floor, said floor having an opening;

a twistlock member comprising a shaft supported for rotation about its longitudinal axis and extending vertically within said housing, and a horizontally oblong latch head fixed to the lower end of said shaft;

guide means for laterally supporting said member through movements lengthwise of said axis through said opening between a position locating said latch head in spaced subjacent relation to said floor and a position at least partly within said housing and said opening;

retractable boss means for protecting said member from lateral forces connected with said member to be carried thereby upwardly from and downwardly to a lowest position wherein a lower portion of the boss means projects through said opening at the lowest position of said member into close proximity with the head, said lower portion having a transaxial cross sectional contour in general conformity with the transaxial maximum horizontal cross section of the head;

stop means in said housing for laterally engaging an upper portion of said boss means at said lowest position of said member to fix the boss means against movement in a direction transversely of said axis; and power means connected with and reacting between said member and supporting means in fixed relation with said housing for effecting said vertical movements of said member and said boss means.

2. The mechanism of claim 1 wherein:

said guide means comprises a pair of parallel channels fixed to the housing at opposite sides of said shaft; and guide elements fixed to said boss in tracking relation with the channels.

3. The mechanism of claim 2 wherein:

said elements engage upward facing surface portions of said housing at said lowest position of the boss means.

4. The mechanism of claim 2 wherein:

said guide means comprises a pair of channels fixed to the housing at opposite sides of said shaft beyond the periphery of said opening;

said boss means provides an upper surface flush with the upper surface of said floor at the lowest position of said boss means; and said guide means further comprises elements fixed to the top surface of said boss means in concavo-convex relation with said channels and radially overlapping relation with areas of the floor beyond the periphery of said opening.

5. The mechanism of claim 4 wherein:

said power means comprises a hydraulic piston cylinder assembly, pivotal connecting means in fixed relation with said housing connecting with one end portion of said assembly, a bell crank having one end portion connected to the other end portion of said assembly, pivotal connecting means in fixed relation with said housing connecting with an intermediate portion of the bell crank, the other end portion of the bell crank being arranged to swing through an arc maintaining bearing relation with said upward-facing surface of said boss means through its range of vertical movement with said member.

6. The mechanism of claim 5 comprising:

a detent piece secured to both of said elements and extending transaxially therebetween in clearance with said shaft and close clearance with an upper surface of said other end of the bell crank when positioned against said boss means, said assembly being of the double acting type;

and detent means securing said boss means from appreciable movement lengthwise of said shaft.

7. The mechanism of claim 5 wherein:

said power means comprises a second hydraulic piston cylinder assembly, second pivotal connecting means in fixed relation with said housing connecting with one end portion of said second assembly, a second bell crank having one end portion connected to the other end portion of said second assembly, second pivotal connecting means in fixed relation with said housing pivotally connecting with an intermediate portion of the second bell crank, joining means for connecting the other end portion of the second bell crank with an upper portion of said shaft, said joining means pivotally connecting with said bell crank along an axis in transverse relation with said shaft axis and connecting with said shaft in longitudinally fixed concentric and rotatable relation to said shaft axis to effect the raising and lowering thereof through expansion and contraction of said second assembly.

8. The mechanism of claim 1 wherein:

said power means comprises a hydraulic piston cylinder assembly, pivotal connecting means in fixed relation with said housing connecting with one end portion of said assembly, a bell crank having one end portion connected to the other end portion of said assembly, pivotal connecting means in fixed relation with said housing pivotally connecting with an intermediate portion of the crank, joining means connecting the other end portion of the bell crank to the upper portion of said shaft to effect raising and lowering movements of said element in response to expansion and contraction movements of the assembly; said joining means connecting pivotally to said bell crank along an axis in transverse relation with said bell crank and with said shaft in concentric, longitudinally fixed, rotatable relationship;

means connecting with said shaft to secure said boss means to a desired position along said shaft causing said boss means to be positively moved by the shaft in upward and downward movements thereof.

9. The mechanism of claim 1 wherein:

said power means comprises a hydraulic piston-cylinder assembly anchored by one end in said housing to expand and contract in a direction parallel to the axis of said shaft;

means connecting the other end of said assembly with a portion of said shaft to cause said member to be propelled in its upward and downward movements in response to expansion and contraction movements of said assembly.

10. The mechanism of claim 9 wherein:

said piston-cylinder assembly is mounted in coaxial tandem relation with said shaft axis and said piston-cylinder assembly, said assembly having a piston and a piston rod which are rotatable about an axis thereof within the cylinder, said shaft and said rod being connected in non-rotatable and tandem relationship.

11. The mechanism of claim 1 comprising:

a crank arm extending radially outwardly from said shaft having a hub surrounding said shaft, said shaft and hub defining tongue and groove means permitting relative axial movement therebetween and fixing the arm in non-rotatable relation with said shaft;

said housing having partition means fixed therein within the range of said tongue-and-groove means, radial overlapping flange means shared by said hub and said partition means for fixing the axial position of said arm leaving said arm free to rotate.

* * * * *

UNITED STATES PATENT OFFICE
CERTIFICATE OF CORRECTION

PATENT NO. : 3,892,436
DATED : July 1, 1975
INVENTOR(S) : Jack E. Fathauer

It is certified that error appears in the above-identified patent and that said Letters Patent are hereby corrected as shown below:

The issue date on the first page of the patent reads "July 1, 1974" it should be --July 1, 1975--.

Signed and Sealed this sixteenth Day of September 1975

[SEAL]

Attest:

RUTH C. MASON
Attesting Officer

C. MARSHALL DANN
Commissioner of Patents and Trademarks